Sept. 18, 1962 D. A. HARRIS ET AL 3,054,521
APPARATUS FOR HANDLING LOADS
Filed Dec. 22, 1958 6 Sheets-Sheet 1

INVENTORS.
DONALD A. HARRIS
ROBERT C. SHOEMAKER
BY BUCKHORN, CHEATHAM & BLORE
ATTORNEYS

Sept. 18, 1962  D. A. HARRIS ET AL  3,054,521
APPARATUS FOR HANDLING LOADS
Filed Dec. 22, 1958  6 Sheets-Sheet 2

INVENTORS.
DONALD A. HARRIS
ROBERT C. SHOEMAKER
BY BUCKHORN, CHEATHAM & BLORE
ATTORNEYS

Sept. 18, 1962  D. A. HARRIS ET AL  3,054,521
APPARATUS FOR HANDLING LOADS
Filed Dec. 22, 1958  6 Sheets-Sheet 5

Fig. 18

INVENTORS.
DONALD A. HARRIS
ROBERT C. SHOEMAKER
BY
BUCKHORN, CHEATHAM & BLORE
ATTORNEYS 3,054,521
APPARATUS FOR HANDLING LOADS
Donald A. Harris, Vancouver, Wash., and Robert C. Shoemaker, Portland, Oreg., assignors to Hyster Company, Portland, Oreg., a corporation of Nevada
Filed Dec. 22, 1958, Ser. No. 782,269
10 Claims. (Cl. 214—651)

This invention relates to vacuum method and apparatus for handling loads and particularly to improvements on the methods and apparatus disclosed in the copending application of Donald A. Harris, filed September 15, 1958, Serial No. 761,218, and entitled Method and Apparatus for Handling Loads.

It is a main object of the present invention to provide a method and apparatus of the type under consideration especially adapted for use with an industrial lift truck.

A further object of the invention is to provide an apparatus in the form of an attachment which may be detachably mounted on the load carriage of a conventional lift truck.

Another object of the invention is to provide an apparatus for handling loads utilizing the vacuum principle and adapted to be lifted by a crane or other top lifting mechanism.

Still another object of the invention is to provide an apparatus of the type under consideration which is adjustable to fit different size loads.

Another object of the present invention is to provide an apparatus of the type under consideration especially adapted for use with straddle carriers.

Other objects of the invention will be apparent from the following description taken in connection with the accompanying drawings wherein.

*First Form of the Invention*

Figure 1:
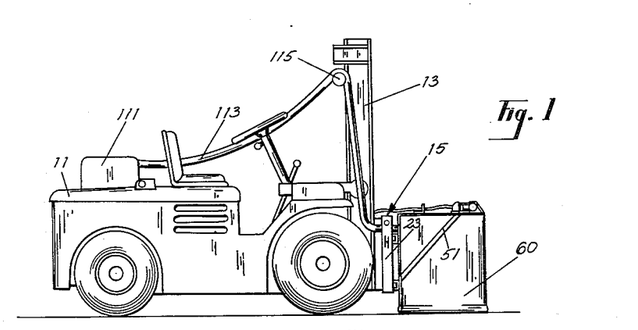
FIG. 1 is a side view of an industrial lift truck equipped with an apparatus of the present invention.
Figures 2, 3:
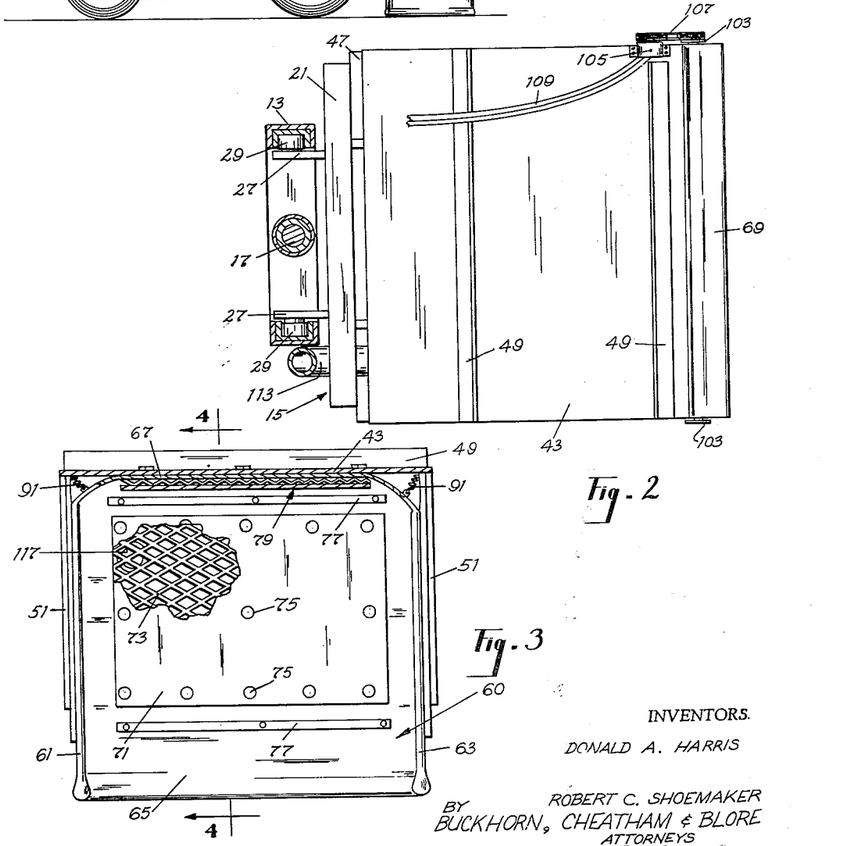
FIG. 2 is a top view of the attachment, taken on a scale larger than that employed in FIG. 1 and showing the mast assembly in section.
FIG. 3 is a front elevational view of the attachment, with the upper part broken back to a place behind the motor 105, and with other parts being broken away for convenience in illustration.
Figure 4:
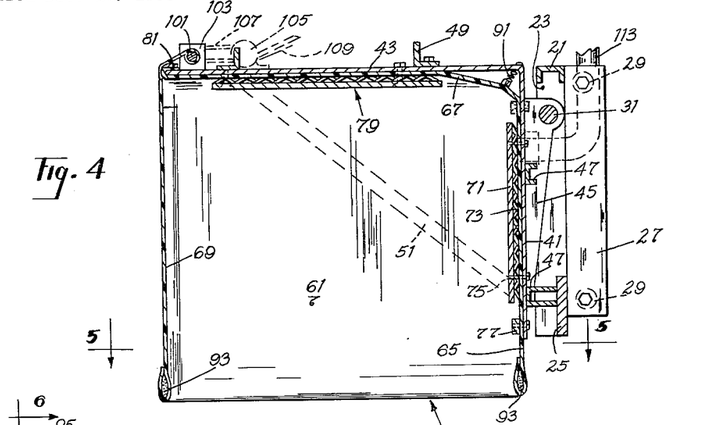
FIG. 4 is a vertical section taken along line 4—4 of FIG. 3.

FIGS. 1 and 2 show an industrial lift truck 11 having a conventional multisection mast 13 at its front end, and a load carriage generally entitled 15 movable vertically therealong in conventional fashion, such as under the influence of a ram 17. A conventional form of carriage is shown and includes an open, generally rectangular frame which is best shown in FIGS. 1, 2 and 4, and which includes a top member 21; a pair of spaced side members 23, one of which is shown in FIG. 4; and a bottom member 25. A pair of carriage plates 27, which are best shown in FIGS. 2 and 4, are secured to the top and bottom members 21 and 25 and project rearwardly and carry upper and lower rollers fitting within the inner channels of the mast 13, the upper rollers 29 being shown in FIG. 2. The carriage includes a mounting bar or rod 31, which is best shown in FIG. 4, and which is usually in two sections, but which is shown for convenience as a single piece.

An attachment of the present invention is detachably mounted on the carriage and comprises an essentially hoodlike structure which includes a rigid metal backing plate 41 and a forwardly projecting top plate 43 formed of a single piece, or formed of two pieces joined together. The backplate 41 has rearwardly projecting mounting pieces 45 formed with holes to receive the bar 31, which is axially slidable to permit removal of the attachment from the carriage, or mounting of the attachment on the carriage. The backplate has reinforcing strips 47, the bottom one of which bears against the bottom member 25 of the carriage as shown in FIG. 4. The top plate 43 is also preferably reinforced by reinforcing members 49.

There is a pair of braces 51, one being shown in FIG. 1, connecting the top plate and the backplate and assisting in the support of the top plate.

The hoodlike structure further includes a flexible three sided curtain or embracing member, generally entitled 60, suspended from the top plate and the backplate. The three-sided curtain has an open front and bottom and two laterally located sides 61 and 63 and a back side 65, and a top 67, this structure being best shown in FIGS. 4 and 5. There is a single-piece curtain 69 which closes the open front of the three-sided curtain and which will be referred to presently.

The back side, which for convenience will be referred to as the back section of the three-sided curtain, is clamped against the front face of the backplate 41 by a clamping plate assembly including a clamping plate 71 and an expanded metal spacer 73, the clamping assembly being mounted in place by means of bolts 75. A pair of strips 77 located above and below the clamping plate assembly, as is best shown in FIG. 4, also clamp the back section of the three-sided curtain against the backplate for purposes to be described.

The top section of the three-sided curtain is similarly clamped against the top plate 43 by a clamp assembly generally entitled 79 which is constructed similarly to the above-described clamp assembly. The front margin of the top section of the three-sided curtain passes around the front edge of the top plate 43 and is clamped against the top side of the top plate by a strip 81.

As is apparent from FIGS. 3 and 4, the clamping plate assemblies are of smaller dimensions than the sections of the flexible curtain which they clamp against the mounting plates, this leaving unattached or free marginal portions of these sections. In order to support these marginal portions in positions to conform to a rectangle approximately the size of the back and top plates, spring devices 91 are provided along the sides of the top plate and also along the joint between the top and back plate to urge the curtain to assume the form and shape shown in FIGS. 3 and 4, but to allow the curtain to assume other forms if the curtain is urged to do so by external or ambient pressure when the load enclosed by the three-sided curtain is of smaller width than the distance between the sides of the curtain, as the parts are shown in FIG. 3. This enables the three-sided curtain to adjust itself to the size of the load within certain limits.

The lower margins of the side sections 61 and 63 and the back section 65 of the three-sided curtain are doubled back and secured to form hollow chambers receiving a weighting material 93, such as, sand, lead shot or like particled material which will tend to hold the curtain relatively straight in a vertical position, and yet not interfere with desired movements of the curtain at the time of embracing a load.

Figures 5, 6, 7, 8, 9, 10:
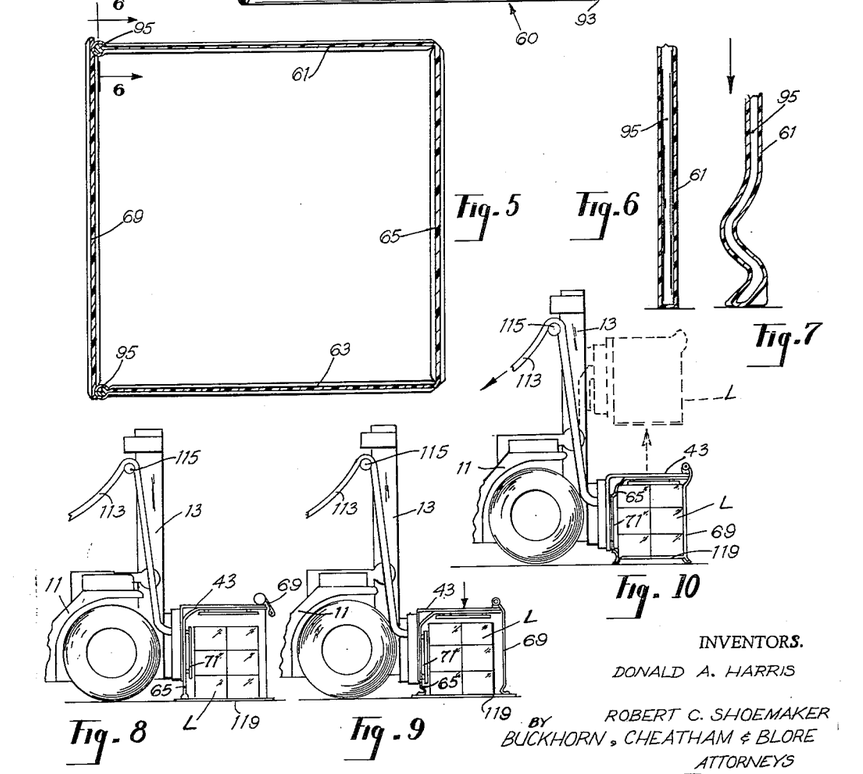
FIG. 5 is a horizontal section taken along line 5—5 of FIG. 4.
FIG. 6 is a fragmentary vertical section taken along line 6—6 of FIG. 5.
FIG. 7 is a view similar to FIG. 6 but showing a position assumed by the structure disclosed in FIG. 6 under actual operating conditions.
FIGS. 8, 9 and 10 are diagrammatic views showing various stages during the operation of the truck.

The front margins of the side sections 61 and 63 of the three-sided curtain also have chambers formed therein receiving flexible rods or tubes 95 which are best shown in FIG. 5 and which provide some form-sustaining characteristics for the front edges of the curtain and yet permit these edges to deform, flex and bend when desired, as will be presently described.

Referring to FIGS. 4 and 5, means are provided for raising the front curtain 69 to enable the three-sided curtain 60 to embrace a load, and for then lowering the front curtain so that the load is enclosed on all four sides. These means include a roller or shaft 101 journaled in upstanding pieces 103 secured to the top plate 43. The curtain is wound around and is secured to this roller or shaft, and a reversible motor 105, which is mounted on the top plate 43, drives the shaft through a chain-and-sprocket arrangement 107. The motor may be electric or hydraulic, with the energy supplied through flexible lines 109 which extend rearwardly to the truck and preferably over a slack take-up mechanism of conventional construction which is not shown in the case of the lines 109.

Referring to FIG. 5, the front curtain is wider than the rear wall section 65 so that the side margins of the front curtain considerably overlap the front edges of the side wall sections 61 and 63 of the three-sided curtain. This enables the front curtain to properly engage the front edges of the side wall sections 61 and 63, as shown in FIG. 5, to form a seal or at least a partial seal therewith.

A source of vacuum or reduced pressure is provided in the form of a blower 111, which is best shown in FIG. 1, and which is mounted on the truck body. The blower has a flexible hose 113 extending forwardly over a slack take-up device 115 of conventional construction and then downwardly to the attachment at the front of the truck. Referring to FIGS. 2 and 3, the front end of the hose is secured, preferably detachably secured, to the rear plate 41 over an opening 117 formed in the plate and in the rear section 65 of the three-sided curtain. It is pointed out that the hose is of considerable size and is disposed in flanking relation with respect to the mast 113 as is apparent from FIG. 2. The hole 117 is located behind the expanded metal 73 for a reason to be apparent presently.

Operation

FIGS. 8, 9 and 10 are schematic or diagrammatic views and actually show the truck in side elevation, but show the attachment mostly in longitudinal vertical section. However, for convenience, no section lines are shown, and the disclosure is merely to show the operation of the attachment with more clarity than would be possible from a plain side view of the attachment.

The load L, which may comprise a single piece or a plurality of pieces or packages as shown in FIG. 8, is placed on a flexible sheet of material 119, which serves as a pallet. The front curtain 69 is raised to the position shown in FIG. 8 to enable the three-sided curtain to be moved over and in embracing relation with respect to the load L. The flexible tubes 95 at the front edges of the three-sided curtain 60 function during the embracing operation to hold the side wall sections of the three-sided curtain in relatively vertical positions and prevent the side wall sections from being readily folded back on themselves as might occur if an edge of one of these side wall sections caught on a portion of the load.

At the time the attachment is moved over a load, the carriage is arranged at a level such that the top clamping plate assembly 79 is substantially above and thus readily clears the load. At this time, it is immaterial whether the bottom edges of the three-sided curtain are in contact with the floor or not, but preferably the carriage is raised at such a level that the lower edges clear the floor so that they will not rumple the sheet 119 as the truck approaches the load.

After the three-sided curtain has been properly arranged in embracing relationship with respect to the load, the carriage and the curtain 69 are simultaneously lowered to bring the lower edges of the three-sided curtain and the bottom edge of the front curtain 69 into engagement with the upper surface of the flexible pallet 119 and also to bring the side margins of the front curtain in contiguous relation with respect to the front edges of the side sections of the three-sided curtain. The parts are then in approximately the position shown in FIG. 9. It is pointed out at this time that the flexible tubes or rods 95 at the front edges of the side wall sections 61 and 63 do not interfere with the flexing of the side wall sections as is apparent by reference to FIG. 7 which shows the front edge of side wall section 61 in a flexed condition.

There is a control lever near the operator, not shown, which enables the operator to control the operation of the blower 111. The blower may be in operation at the time the attachment is moved into an embracing position over the load or the blower may be turned on after the parts have been arranged in the FIG. 9 position. Preferably, the lever at the operator's position controls a valve to enable the blower to be left on and yet not to draw air through the hose 113 until the desired time.

In any event, if the blower is not in operation or is not drawing air through the hose 113 at the time the parts are in the FIG. 9 position, this is accomplished by an appropriate operation of the lever above mentioned so that air is withdrawn from the space within the flexible enclosure completely surrounding the load L. This creates a lower pressure within the enclosure than outside the enclosure, and the resulting external or ambient pressure forces the side sections 61 and 63 and the front curtain 69 against the load in tight embracing relation with respect to the load. This also forces the side edges of the front curtain into sealing engagement, or at least partial sealing engagement, with the front edges of the side sections 61 and 63. However, more importantly, the forces created by such differential pressures hold the load in firm engagement with the upper clamping assembly 79 because of the forces upwardly on the load from its underside, and also force the load into firm engagement with the rear clamping assembly because of the force created by the differential pressure on the front curtain 69. The reason for this is, of course, that the top plate 41 and backplate 43 serve to create areas relieving the load of the differential pressure created by the partial vacuum within the enclosure, and thus the differential forces that are effective on the flexible enclosure to force the load against the parts relieved of the differential pressure.

It is assumed that the flexible pallet rests on a surface which is sufficiently rough to enable air to pass under the pallet. If not, an expanded metal member may be provided beneath the pallet, but, of course, would not be picked up.

Now, the load may be lifted by merely raising the carriage as shown in dotted lines in FIG. 10. It is pointed out that the curtain material does not have to have sufficient strength to support the load, since the load is supported by the differential pressure and not by the curtain material.

Preferably, the flexible curtain is made of a flexible material which is impervious to the passage of air, such as a polyethylene film, but there are many other flexible sheet materials which will work satisfactorily. In fact, material which is pervious to the passage of air, such as kraft paper, will work satisfactorily provided the amount of air removed from the enclosure is greater than the amount of air passing through the curtain material and also through whatever random openings accidentally occur between the front curtain and the three-sided curtain and between the pallet and the three-sided curtain and the front curtain.

At this time, it is pointed out that it is not necessary for the edges of the flexible pallet and the edges of the flexible curtain to form a complete air tight seal with the three-sided curtain because in many instances, openings or separations have been noted and yet not impaired the lifting operation. Frequently, the flexible material forms a seal with the load rather than with other curtain material at places interiorly of gaps between the curtain and other material, and in other instances the gaps are not sufficiently large to prevent the creation of a desired partial vacuum within the enclosure. It is further pointed out that the pressure does not have to be great, and in fact loads may be satisfactorily lifted with only a few inches of pressure. The expanding metal 73 and the strips 77 are to insure good distribution of the vacuum and prevent the curtain material from closing off the source of vacuum or materially restricting communication between the hose 113 and the interior of the flexible enclosing means around the load.

It is pointed out that the hoodlike structure may be considered as having a top and depending sides, the front side being the curtain 69 which may be raised and lowered to permit the hoodlike structure to be moved over a load or separated from a load.

*Second Form of the Invention*

Figure 11:
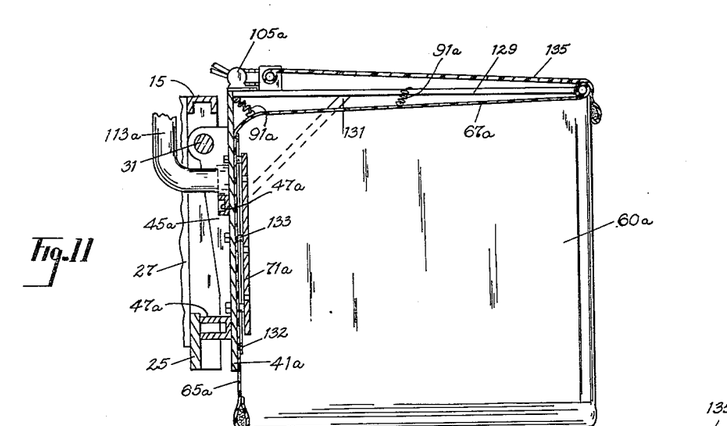
FIG. 11 is a vertical section taken longitudinally through a modified form of the attachment.
Figures 12, 13:
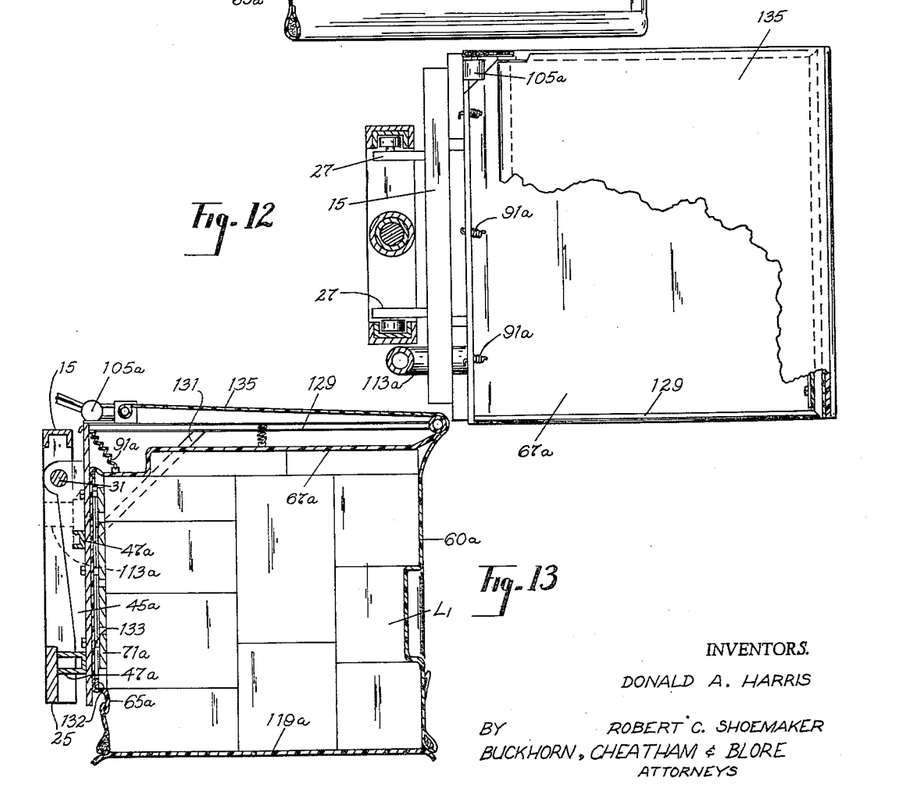
FIG. 12 is a plan view of the attachment, parts being broken away for convenience in illustration, and the mast assembly being in section.
FIG. 13 is a view showing a typical configuration assumed by the curtains when the device is in operation.

Referring to FIGS. 11, 12 and 13, the modified form of the attachment shown is mounted also on the bar 31 of the carriage 15 by means of mounting pieces 45a. The attachment includes a backplate 41a, but has no top plate, and instead has an open three-sided frame 129 connected at its rear ends to the backplate 41a and also connected by braces 131 to the backplate.

The backplate is provided on its rear face with reinforcing crosspieces 47a, and is provided on its front face with a perforated distributing plate 71a held away from the backplate by stand-off bolts 133 which pass through a flexible back section 65a of a three-sided curtain 60a. The three-sided curtain 60a is for all practical purposes identical to the curtain 60 of the first form of the invention. A rectangular frame 132 secures the back section 65a against the backplate 41a in sealing relation thereto, so that ambient air pressure is not effective against the rear surface of the back section bounded by the frame. This prevents the central portion of the back section from being torn by being forced forwardly relative to the stand-off bolts 133.

Springs 91a yieldingly support the top section 67a of the three-sided curtain in a manner very similar to that in which the springs 91 support the three-sided curtain in the first form of the invention. It is pointed out however, that in this form of the invention there is no top clamping plate assembly as in the first form of the invention. There is, however, a front curtain 135 controlled by a motor 105a in a manner similar to the control of the curtain in the first form of the invention, although it is pointed out that the motor here is mounted near the backplate 41a rather than at the front of the attachment.

An air hose 113a is also provided to create a partial vacuum within the three-sided curtain at the proper time. In operation, the attachment is maneuvered and operated in a manner very similar to that described in connection with the first form of the invention and the pressure reduced within the enclosure to create an ambient inwardly directed pressure, this pressure creating a force which consolidates a particled load into a single rigid unit and also presses the load firmly against the distributing plate 71a.

It is apparent that a load can be picked up which is equal to the force of the load against the plate 71a multiplied by the coefficient of friction between the plate and the load. It is further mentioned that the load L1 need not be of regular formation and that the flexible curtain material will conform or partially conform to any irregularities of the load as is apparent from the notch in the upper left-hand corner of the load in FIG. 13 and the recess at the forward central portion of the load. It is further pointed out that the distributing plate 71a assures that the supply of vacuum will not be cut off by the load engaging this plate nor by the engagement of the rear flexible wall section of the three-sided curtain with the plate, because of rumples that naturally develop in the curtain material.

*Third Form of the Invention*

Figure 15:
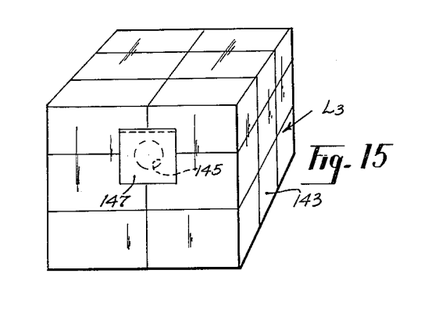
FIG. 15 is a perspective view of a load to be lifted, the view being on a scale larger than that used in FIG. 14.

In the third form of the invention, there is a suction head 141 for engagement with a particled load L3 enclosed within a flexible film or wrapper 143 which preferably is formed of material impervious to the passage of air therethrough, although as previously pointed out, this requirement is not absolutely necessary. The enclosing film or wrapper includes an opening 145 which is normally closed by a simple flapper valve 147 formed of the same material as that of the film or wrapper or of other convenient flexible material.

If the load unit as shown in FIG. 15 is under an internal partial vacuum, the flapper valve 47 will be closed to maintain this vacuum. However, if it is not under partial vacuum, the flapper valve will merely remain close to, but not necessarily touching the opening 145.

Figure 14:
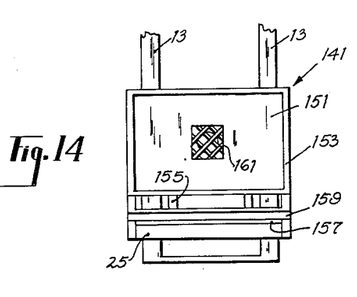
FIG. 14 is a front view of a still further modified form of attachment.

The suction head 141 includes a main rigid plate 151, which in the particular form of the invention disclosed is of rectangular shape, although this is not a limitation on the form of the invention. An elastomer seal 153 is provided around the front peripheral edge of the plate 151. The plate has rearwardly extending mounting pieces 155 for receiving the rods 31 of a carriage 15. The mounting pieces project down below the plate 151 and are joined by a crosspiece 157 for abutting engagement with the bottom member 25 of the carriage 15. Secured to the front of the member 157 is a heeling bar 159 against which the load unit may bear at a place below the suction head 141.

The suction head is connected to a source of vacuum through a hose 113b which is connected in a central opening in the plate 141. A reticulated structure 161 is provided over the inlet to the hose 113b to prevent the flapper valve 147 from closing off the source of vacuum.

Figure 16:
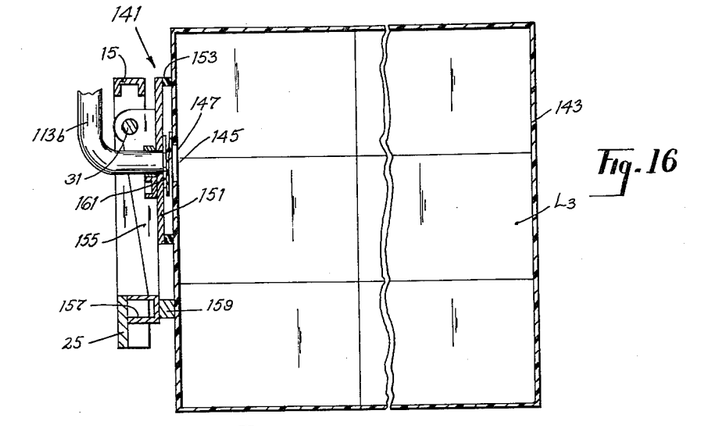
FIG. 16 is a vertical longitudinal section through the attachment and the load during one stage of the operation of the attachment.

In operation, it may be assumed that the load unit, which includes the load L and its flexible enclosing means 143, is not under an internal partial vacuum. In order to lift the load, the lift truck is run up to the load with the suction head in general register with the flapper valve 147 and air withdrawn through the hose 113b from the interior of the flexible enclosure 143. The flapper valve 147 will automatically open once air is withdrawn through the hose 113b to allow the air to be withdrawn from the enclosure 143. This creates a partial vacuum within the enclosure and thus creates an ambient pressure which consolidates the packages or particles of the load and also forces the load against the suction head 141 because the plate 151 creates an area next to the package that relieves the package from the ambient pressure or differential pressure which acts on the other parts of the load.

After the creation of a partial vacuum within the enclosure 143, the load may be lifted for the same reasons expressed in connection with the second form of the invention, and may subsequently be deposited. When deposited, and the source of partial vacuum through the hose 113b is cut off, the flapper valve 147 automatically closes to retain the partial vacuum within the package and thus maintain the individual parts of the load in a consolidated condition. If for any reason the load happens to be under a greater partial vacuum at the time it is to be picked up than is to be applied through the hose 113b, the flapper valve will not be open at the time of the lifting operation. As a matter of fact, if the package is under a partial vacuum, the package may be lifted by engaging the package on any side thereof by the suction head 141. In fact, in certain instances this would be desirable since it would enable the application of a lesser vacuum at the suction head than within the enclosure 143.

*Fourth Form of the Invention*

Figure 17:
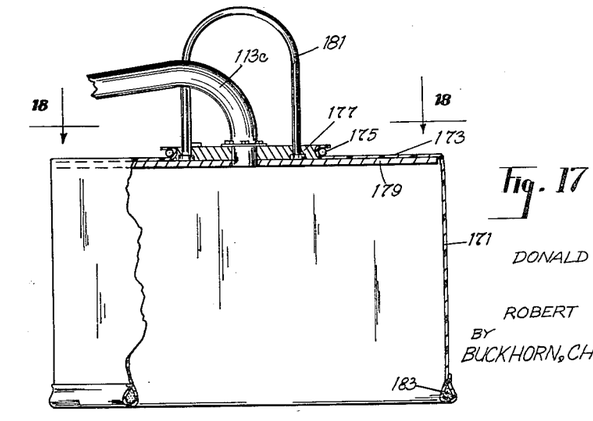
FIG. 17 is a side view of an apparatus of the present invention intended to be lifted from the top, parts being shown in section.
Figure 18:
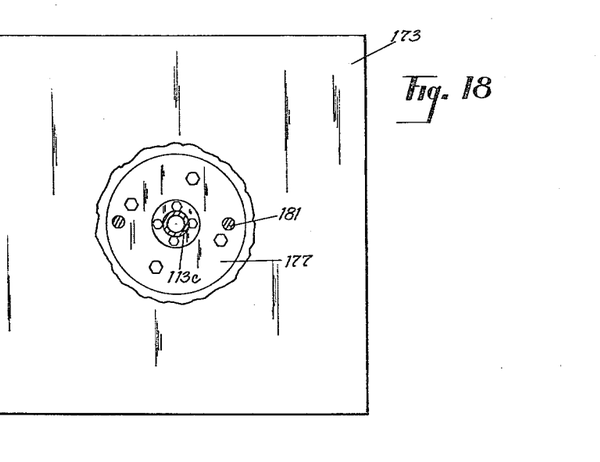
FIG. 18 is a horizontal section taken along line 18—18 at FIG. 17.

FIGS. 17 and 18 show a fourth form of the invention intended to be lifted from its top by any suitable lifting mechanism, such as, a crane, hoist or boom. This form of the invention includes a four-sided curtain 171 preferably having an integral top section 173 secured, such as by a snap ring 175 or other binding means within a peripheral groove of a disc-shaped member 177. Secured to the disc-shaped member is a square plate 179 which holds the sides of the four-sided curtain 171 at desired distances from one another. A lifting bail 181 is secured to the disc-shaped member 177 and a suction hose 113c has an end secured to the disc-shaped member 177 and projecting through a hole in this member and also the plate 179 to provide a source of vacuum for the interior of the four-sided curtain.

The four sides of the curtain have the lower margins thereof weighted, as shown at 183, in a manner similar to that described hereinabove in connection with the first form of the invention.

In use, the load is preferably placed on a flexible sheetlike pallet of the type hereinbefore described, and the four-sided curtain is placed over the load and down against the flexible pallet. Suction is then applied on the hose 113c to provide a partial vacuum within the enclosure provided by the four-sided curtains and the pallet, so that the ambient pressure thus created consolidates the load, if the load is of particled nature, but in any case, forces the load against the plate 179 with a force proportional to the amount of vacuum within the enclosure. To lift the load, a lifting force is imposed on the bail 181 and the load is lifted by virtue of its being pressed against the plate 179 by the ambient pressure below the pallet rather than by the strength of the curtain material.

*Fifth Form of the Invention*

FIGS. 19 through 23 show a fifth form of the invention incorporated in a straddle carrier. The carrier, apart from the attachment of the present invention, is of generally conventional form and includes a frame 251 supported by wheels 253. The frame and wheels define a tunnel-like load space permitting the carrier to move over a load which is to be picked up. The load L25 is shown as comprising a stack of bricks resting on a flexible pallet 255 which is similar to the flexible pallets heretofore mentioned.

Figures 19, 20, 21, 22, 23:
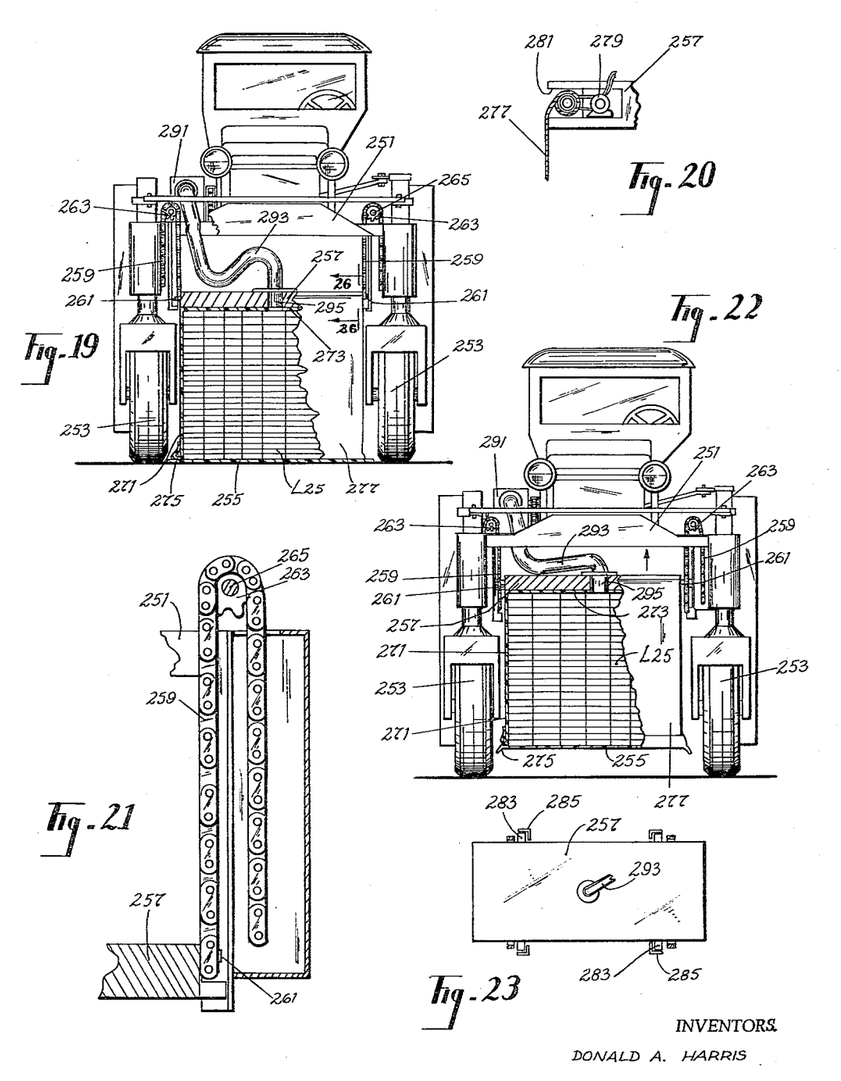
FIG. 19 shows a front view of a straddle carrier equipped with an apparatus of the present invention, parts being broken away and shown in section for convenience in illustration.
FIG. 20 is a fragmentary sectional view taken along line 20—20 of FIG. 19 on a scale larger than that employed in FIG. 19.
FIG. 21 is an enlarged vertical section showing part of the lifting arrangement for the apparatus.
FIG. 22 is a view similar to FIG. 19, but showing the load in its lifted condition.
FIG. 23 is a plan view of the apparatus on a much smaller scale than that employed in FIGS. 19 and 22, and showing parts of the straddle carrier in section.

An attachment embodying the concepts of the present invention is mounted within the load space and includes a rectangular platelike member 257 supported by a plurality of chains 259 connected at their lower ends at 261 to the side edges of the platelike member as indicated for one chain in FIG. 21. The chains are reeved over sprockets 263 driven by shafts 265. The shafts are driven by a motor on the carrier in conventional fashion. The free ends of the chains may be left dangling over the sprockets 263 or may be secured to the frame of the machine with enough slack to allow the platelike member 257 to move downwardly to its lowermost position.

Secured to the underside of the platelike member 257 is a two-sided curtain 271 having a top section 273 next to the platelike member 257 and having an open front end and an open back end. As is apparent from FIG. 19, the two sides of the curtain are disposed next to the wheels 253 but in sufficiently spaced relation from the wheels to allow the wheels to turn in steering the carrier. The lower side edges of the curtains are weighted as indicated in 275, so that these edges will rest against the upper surface of the flexible pallet 255 when the platelike member 257 is lowered. The front and rear vertical edges of the curtain 271 may have stiffening means, such as the elastomer or resilient tubes 95 of the first form of the invention, to assure that the curtain correctly and properly moves over a load in picking up the load.

There is a front curtain 277 and a similar rear curtain not shown for the platelike member 257 for closing the open front and back ends of the two-sided curtain 271. The curtain 277 therefore has a width slightly greater than that between the two sides of the two-sided curtain 271 so as to abut against the front edges of the two-sided curtain. The rear curtain is similarly formed.

The front curtain 277 is rolled up and down under control of a motor 279 which may be hydraulically or electrically operated and is mounted within a recessed portion 281 at the front of the platelike member 257. The lower edge of the front curtain is weighted as are the curtains previously described and the same is true of the rear curtain. The rear curtain is similarly controlled.

FIG. 23 shows that the platelike member 257 has laterally projecting portions 283 fitting within vertical guides 285 secured to the frame of the machine. These guides limit lateral and longitudinal movement of the platelike member relative to the frame of the machine without interfering with vertical movement of the platelike member.

A source of vacuum in the form of a blower 291 is provided on the frame of the machine and connected by a flexible conduit or hose 293 to an opening 295 in the platelike member 257. The top section 273 of the two-sided curtain has a matching opening so that air can be withdrawn from the enclosure defined by two-sided curtain, the front and rear curtains, and the flexible pallet 255. More than one opening 295 may be provided and various arrangements for assuring distribution of the vacuum may be provided, such devices being indicated in previous forms of the invention.

In operation, it is contemplated that the rear curtain may be left in a somewhat lowered condition about the same length as the two sides of the two-sided curtain 271, but that the front curtain will be raised. At this time, the platelike member 257 will be in a raised position higher than disclosed in FIG. 8. With the parts in these positions the carrier is moved over a load L7 in general register with the load whereupon the platelike member 257 is lowered and the curtain 277 lowered relative to the platelike member to place the lower edges of all the curtains in engagement with the pallet 255. A partial vacuum is then formed within the enclosure around the load L7 to consolidate the load and also to hold the load against the platelike member 257 because of the ambient pressure beneath the pallet 255. The platelike member may therefore be raised to lift the load of bricks, without imposing any strain of the lifting force on the flexible material of the two-sided curtain or the front or rear curtains or the pallet.

A considerable pile or stack of bricks may be picked up by the attachment. For instance, with a 10 inch vacuum a stack of bricks of the order of 5 feet may be lifted.

Having described the invention in what is considered to be the preferred embodiment thereof, it is desired that it be understood that the invention is not to be limited other than by the provisions of the following claims.

I claim:

1. An apparatus comprising a vehicle, a hoodlike structure supported by said vehicle and having sides and a top for enclosing around a load, said hoodlike structure having an open bottom, said hoodlike structure having its front side in the form of a front flexible curtain mounted for movement to and from a lowered position to enable said hood structure to be moved horizontally in covering relationship to a load, means for raising and lowering the curtain, means for creating a partial vacuum within the said hoodlike structure, said hoodlike structure having flexible portions, and means for relieving a part of said such flexible portions from the ambient pressure created by the partial vacuum whereby the load is held against the last-named means because of such ambient pressure.

2. An attachment for a lift truck comprising a frame, mounting means for connecting the frame to the vertical lifting mechanism of the truck, a hoodlike structure carried by said frame and having a top and depending sides and an open bottom, the front side of said hoodlike structure being in the form of a flexible curtain mounted for movement to and from a lowered position, means for creating a partial vacuum within the hoodlike structure, said hoodlike structure having certain portions thereof of flexible construction, and carrying means connected to said frame for relieving a part of said hoodlike structure from the ambient pressure created by the partial vacuum whereby the load is held against the carrying means by such ambient pressure.

3. An attachment as set forth in claim 2 in which the carrying means is located in an upright position facing forwardly of the lift truck.

4. An attachment as set forth in claim 2 in which said carrying means is located in a horizontal downwardly facing position.

5. An attachment as set forth in claim 2 in which means are provided to enable said enclosing means to automatically adjust in size to the size of the load enclosed within certain limits.

6. In combination, a flexible curtain for embracing a load, said curtain having an opening in a vertical portion of the curtain providing for horizontal movement of the load and curtain relative to one another to locate the load within the curtain, said curtain including vertical edge portions flanking the path of relative movement between the load and curtain, and stiffening means on said edge portions to urge said edge portions to remain in position relative to the remainder of the curtain despite contact between said edge portions and said load, said curtain having lower edges for engagement with a horizontal surface beneath the load, said stiffening means being yieldable in a vertical direction to provide for continued vertical approaching movement of said curtain and such horizontal surface after initial contact between the lower edges of the curtain and such surface.

7. An apparatus comprising a flexible hoodlike structure, means for moving said hoodlike structure in a horizontal direction toward a load, said hoodlike structure having a top and four sides depending from said top, said hoodlike structure having a open bottom, means for raising the front side of the hoodlike structure to enable the structure to be moved into covering relationship with respect to the load, said raising means being operable to lower said front side after the load has been covered, and means for creating a subatmospheric pressure within said hoodlike structure, part of said hoodlike structure presenting a rigid surface for engaging the load and part of said hoodlike structure presenting flexible wall portions to enable the load under the influence of atmospheric pressure to be forced against said rigid surface.

8. An apparatus comprising a flexible hoodlike structure having a top and four sides depending from said top, said hoodlike structure having an open bottom, means for raising the front side of said hoodlike structure to enable the structure to cover a load and then for lowering said front side, means for moving the hoodlike structure and the load relatively to one another in a horizontal direction to bring the hoodlike structure into covering relationship with the load, and means for creating a subatmospheric pressure within said hoodlike structure, said hoodlike structure having a part presenting a rigid surface for contact with the load and having flexible portions to enable the atmospheric pressure to force the load against said rigid surface.

9. An apparatus comprising a flexible hoodlike structure, means for moving said hoodlike structure in a horizontal direction toward a load, said hoodlike structure having a top and side wall portions for surrounding a load, said hoodlike structure having an open bottom, a portion of said side wall portions being movable independently of the remainder of the side wall portions, means for raising the mentioned portion to enable the hoodlike structure to be moved into covering relationship with the load, and means for creating a subatmospheric pressure within said hoodlike structure, said hoodlike structure presenting a rigid surface for contact with the load and certain portions of said hoodlike structure being flexible to enable the atmospheric pressure to force said load against said rigid surface.

10. A device comprising a hoodlike structure having a top and depending sides for enclosing a load at the top and sides thereof, said hoodlike structure having a rigid portion for contact with the load and flexible portions to enable exterior pressure to force said load against said rigid portion, means for creating a subatmospheric pressure within said hoodlike structure, and resilient means for releasably holding certain of said flexible portions in a normal position out of contact with the load but automatically releasable under exterior pressure to permit said certain portions to move into engagement with the load to conform to the exterior thereof.

References Cited in the file of this patent

UNITED STATES PATENTS

| | | |
|---|---|---|
| 2,681,757 | Kellersman | June 22, 1954 |
| 2,708,046 | Cushman | May 10, 1955 |
| 2,716,497 | Wahl et al. | Aug. 30, 1955 |
| 2,893,581 | Cushman | July 7, 1959 |
| 2,899,088 | Corbin | Aug. 11, 1959 |